Patented Nov. 15, 1949

2,487,861

UNITED STATES PATENT OFFICE 2,487,861

INTERMITTENT ABSORPTION REFRIGERATION APPARATUS

Nils Erland af Kleen, North Stonington, Conn., assignor to Kleen Refrigerator, Inc., Hoboken, N. J., a corporation of Delaware Application November 25, 1946, Serial No. 712,114

9 Claims. (Cl. 62—118)

1

This invention relates to absorption refrigeration and, more particularly, to increasing the cooling capacity of absorption refrigeration systems. The invention contemplates both a novel method of effecting such increase in the cooling capacity of an absorption refrigeration system and improved apparatus characterized by an outstanding cooling capacity.

In the course of extensive development work in the field of absorption refrigeration, I have observed an unusual phenomenon which occurred when a short circuit developed between the electrical heating element of the boiler-absorber of the system and the boiler-absorber itself. When such a short circuit developed I observed a marked reduction in the cooling temperature attained in the evaporator portion of the system. Believing that this unusual result might have been produced by a spark created by such short circuit between the boiler-absorber and the heating element supplied with conventional 60 cycle alternating current, I investigated further the effect of an electric spark on the operation of an absorption refrigerating system. My investigations in this matter have led to the observation that when an electric spark is brought into contact with a structural element of the refrigerating system, a marked reduction is effected in the cooling temperature attained by the evaporator portion of the system.

Accordingly, the present invention comprises an improvement in the method of operating an absorption refrigeration system in which a refrigerating fluid is liberated from an absorbent, the liberated fluid is condensed, the condensed fluid is subsequently evaporated to effect cooling, and the evaporated vapor is absorbed by the absorbent. The improvement of the invention comprises increasing the cooling capacity of the system by subjecting the system to the physical effects which are produced when an electric spark is brought into contact with a structural element of the system. The invention further comprises improved absorption refrigeration apparatus composed of a closed system formed by a plurality of interconnected elements in which refrigerating fluid is liberated from an absorbent material, condensed, evaporated and absorbed, the apparatus being characterized by the presence of means capable of subjecting the system to the

2 physical effects which are produced when an electric spark is brought into contact with a structural element of the system.

Figure 1:
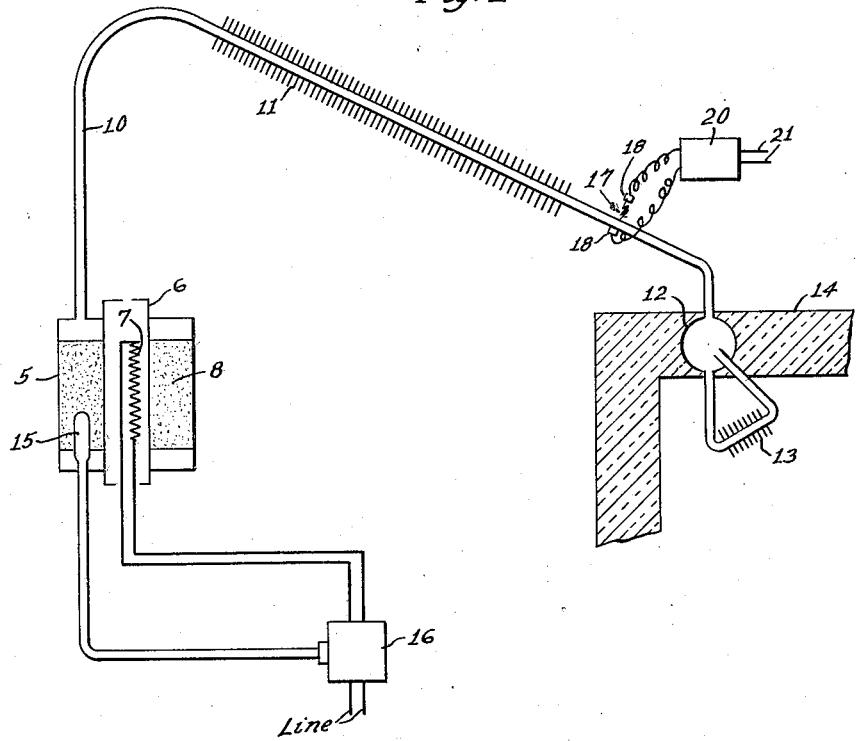
Figure 2:
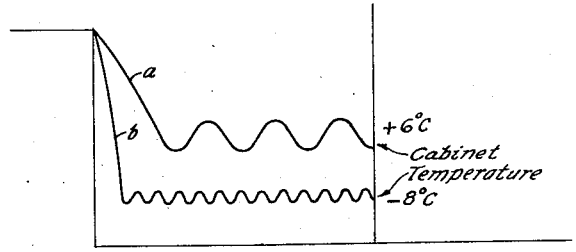

The invention will be more fully understood from the following description taken in conjunction with the drawings, in which Fig. 1 is a schematic view of an absorbent refrigeration system embodying the invention; and Fig. 2 is a chart illustrating comparative refrigerator cabinet temperatures produced by absorption refrigerating systems with and without embodiment of the invention.

The absorption refrigeration system shown in Fig. 1 comprises a boiler-absorber 5 provided with a hollow heating core 6. An electrical heating element 7 is disposed within the hollow core 6 and is adapted to heat absorbent material 8 with which the boiler-absorber is charged. The absorbent material is advantageously of the solid type such as granular strontium chloride, or the like. Refrigerating fluid liberated in vapor form from the absorbent material 8 is delivered through a line 10 provided with a condenser 11 and passes into an evaporator 12. The evaporator communicates with a cooling element 13 disposed within a refrigerating cabinet 14. The system may be provided with any conventional means such as the control device 15 and switch 16 adapted to alternately connect the heating element 7 across an electric power line and disconnect the heating element from the line in order to produce successive "generating" and refrigerating periods in the system.

An electric spark may be brought into contact with a structural element of the refrigeration system by any convenient means. For example, I have found that effective results are obtained by directing an electric spark (indicated at 17 in Fig. 1) against the line 10 by placing a pair of electrodes 18 on opposite sides of the line. A spark generated between the two electrodes will make contact with the line 10 interposed between the electrodes. Contact between the spark and the line may be insured by placing one of the electrodes in contact with the line in such manner that the line becomes one of the spark electrodes.

The spark may be produced by any suitable means. I have obtained effective results with a conventional Ford spark coil 20 connected across the electrodes 18. Although such a coil was capable of producing a spark of considerable length, experimental results show that effective results are obtained with either a long or short spark. Any other suitable spark generator may be used, the spark coil or generator being connected through lines 21 to an appropriate source of electrical energy. Inasmuch as the spark is applied to the refrigerating system with particular effectiveness during the cooling stage, the spark should be of such type as to be relatively cool and not add an appreciable amount of heat to the system during this stage.

At least with the electric sparks which I have used effectively in accordance with the invention, the spark must make contact with a structural element of the refrigeration apparatus. For example, effective results are obtained when the spark of an automobile spark coil energized by a storage battery is brought into contact with the apparatus, whereas the same spark appears to be wholly ineffective when it merely comes close to but does not touch the apparatus.

The effectiveness of the electric spark has been manifested over a wide variety of points of contact. For example, the spark is effective when it makes contact with the boiler-absorber, the vapor line, the condenser or the evaporator, or even with the metal frame structure supporting the parts of the refrigeration system. Thus, the point of contact may be on any structural element of the system.

The increase in cooling capacity of an absorption refrigeration system in accordance with the invention is shown in Fig. 2. With an established heat input for the liberation of refrigerating vapor in the boiler-absorber of a conventional absorption refrigeration system, the drop in the refrigerator cabinet temperature after the system was put into operation followed line $a$ in Fig. 2. The cabinet ultimately reached a minimum temperature of $+6°$ C. With the same heat input into the same absorption refrigeration system which was modified only by the application thereto of an electric spark from a Ford spark coil in accordance with the invention, the cabinet temperature after the system was put into operation followed line $b$ in Fig. 2 and quickly reached and maintained a minimum temperature of $-8°$ C. Thus, the provision of a spark contact with a structural element of the refrigeration system produced a more rapid cooling within the cabinet as evidenced by a more abrupt drop in the evaporator temperature and lowered the cabinet temperature $14°$ C. while maintaining a uniform rate of heat input into the system. Although this result is referred to herein as an increase in the cooling capacity of the refrigeration system, it may also be described as an increase in the cooling efficiency of the system.

The application of an electric spark to a structural element of an absorption refrigeration system in accordance with the invention appears to increase the rate of flow of refrigerating vapor within the system. During the evaporation-absorption stage of the refrigerating cycle this increased rate of flow of refrigerating vapor manifests itself in an apparent increase in the rate of evaporation of liquid refrigerant within the evaporator. I am unable to state with certainty whether this result is obtained by the physical effects of the spark on the absorbent material or its ability to absorb the refrigerating vapor, or by the effect of the spark on the refrigerant itself or its evaporating characteristics, or by some other means, or by some combination of one or more of these means. At present, however, there is a strong indication that the physical effects of the spark include high frequency mechanical vibrations imparted to the system, these vibrations resembling or comprising vibrations of the supersonic type. Although the electric spark may be produced by a relatively low frequency alternating potential, such as a 60 cycle power line or an automobile spark coil, the spark itself is propagated at radio frequencies. It must be understood, nevertheless, that the invention is not limited to or by any theory presented herein. The invention contemplates increasing the cooling capacity of an absorption refrigeration system by the physical effects which are produced when an electric spark is brought into contact with a structural element of the system, whether these physical effects are actually produced by an electric spark or are produced in an equivalent manner. Moreover, although these physical effects have been found to be particularly effective during the cooling (or evaporating-absorption) stage of operation, they may also be used with advantage during the heating (or liberating-condensing) stage of the operation, or during both the heating and cooling stages of the operation.

This application is a continuation-in-part of my copending application Serial Number 391,651, filed May 3, 1941, now abandoned.

I claim:

1. In the method of operating an intermittent absorption refrigeration system in which a refrigerating fluid is liberated from a granular absorbent, the fluid is condensed, the condensed fluid is subsequently evaporated to effect cooling and evaporated vapor is absorbed by the absorbent, the improvement which comprises increasing the cooling capacity of the system by subjecting the system to the physical effects which are produced when an electric spark is brought into contact with a structural element of the refrigeration system.

2. The method according to claim 1 in which the cooling capacity of the system is increased by bringing an electric spark produced by a spark coil into contact with a structural element of the system.

3. The method according to claim 1 in which the cooling capacity of the system is increased by bringing a relatively cool electric spark into contact with a structural element of the system.

4. The method according to claim 1 in which the system is subjected to said physical effects while the condensed refrigerating fluid is evaporating to effect cooling.

5. The method according to claim 1 in which the system is subjected to said physical effects while the refrigerating fluid is being liberated from the absorbent.

6. The method according to claim 1 in which the system is subjected to said physical effects during the complete operating cycle of the system.

7. In an intermittent absorption refrigeration apparatus composed of a closed system formed by a plurality of interconnected elements in which refrigerating fluid is liberated from a granular absorbent material, condensed, evaporated and absorbed, the improvement which comprises means capable of subjecting the system to the physical effects which are produced when an electric spark is brought into contact with a structural element of the refrigeration system.

8. Apparatus according to claim 7 in which a spark coil is operatively associated with the system in such manner as to bring an electric spark into contact with a structural element of the system.

9. Apparatus according to claim 7 in which means are provided for bringing a relatively cool electric spark into contact with a structural element of the system.

NILS ERLAND AF KLEEN.

REFERENCES CITED

The following references are of record in the file of this patent:

UNITED STATES PATENTS

| Number | Name | Date |
|---|---|---|
| 1,884,939 | Wessbald | Oct. 25, 1932 |
| 1,923,451 | Miller | Aug. 22, 1933 |
| 2,008,350 | Dardin et al. | July 16, 1935 |
| 2,009,067 | Mulholland | July 23, 1935 |
| 2,044,750 | Bryant | June 16, 1936 |
| 2,152,243 | Daiger | Mar. 29, 1939 |

FOREIGN PATENTS

| Number | Country | Date |
|---|---|---|
| 379,391 | Great Britain | Sept. 1, 1932 |